May 5, 1953  C. J. WHITE  2,637,313
ADJUSTABLE GRILL
Filed Aug. 25, 1950  2 SHEETS—SHEET 1
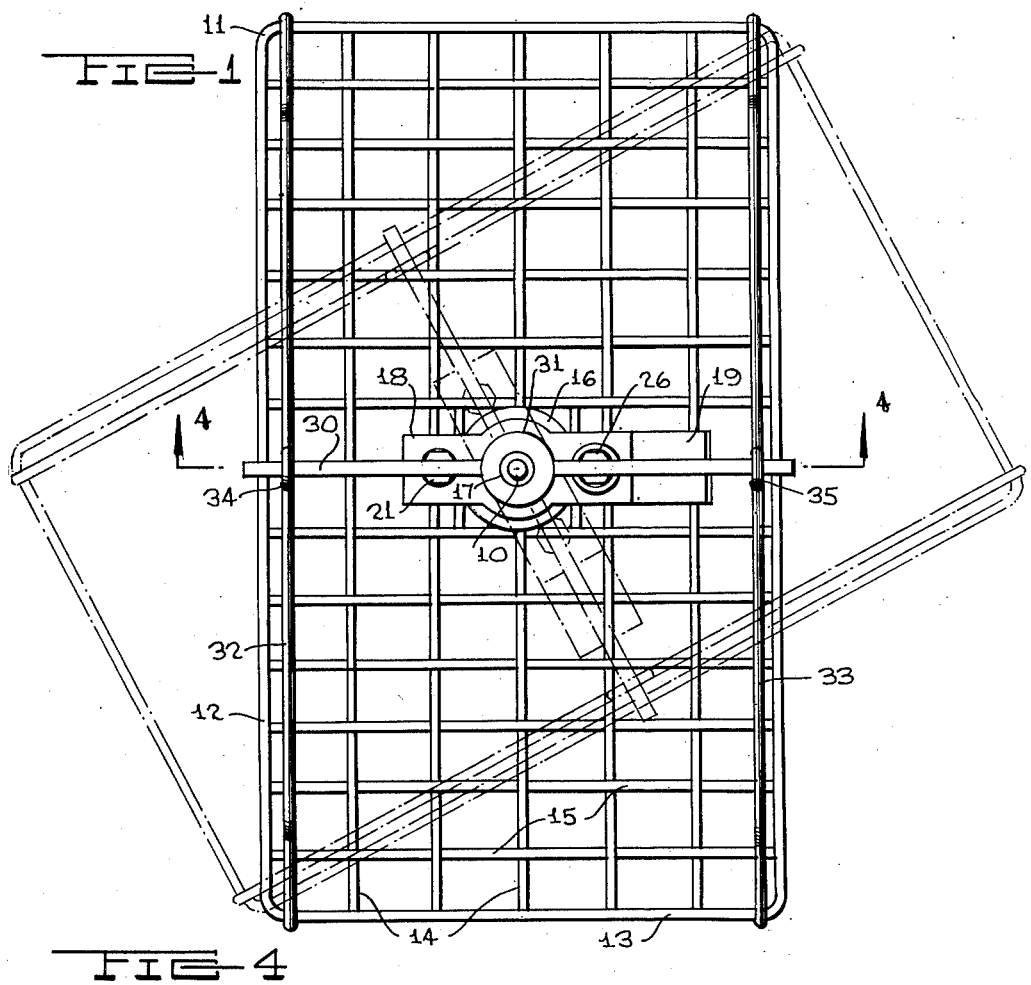
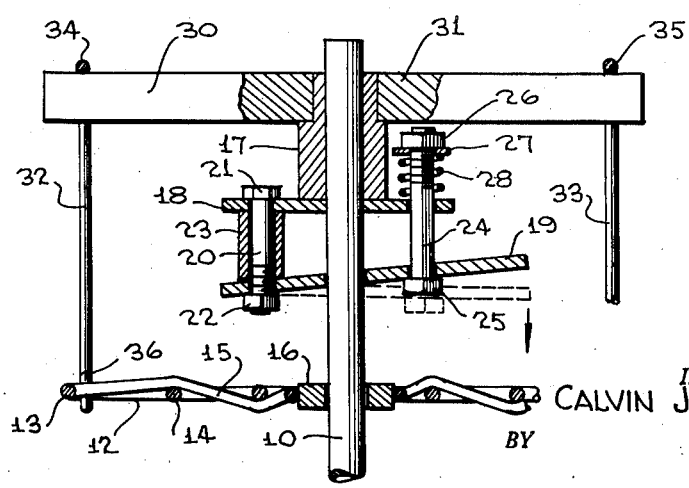
INVENTOR.
CALVIN J. WHITE
BY
McMorrow, Berman & Davidson
ATTORNEYS

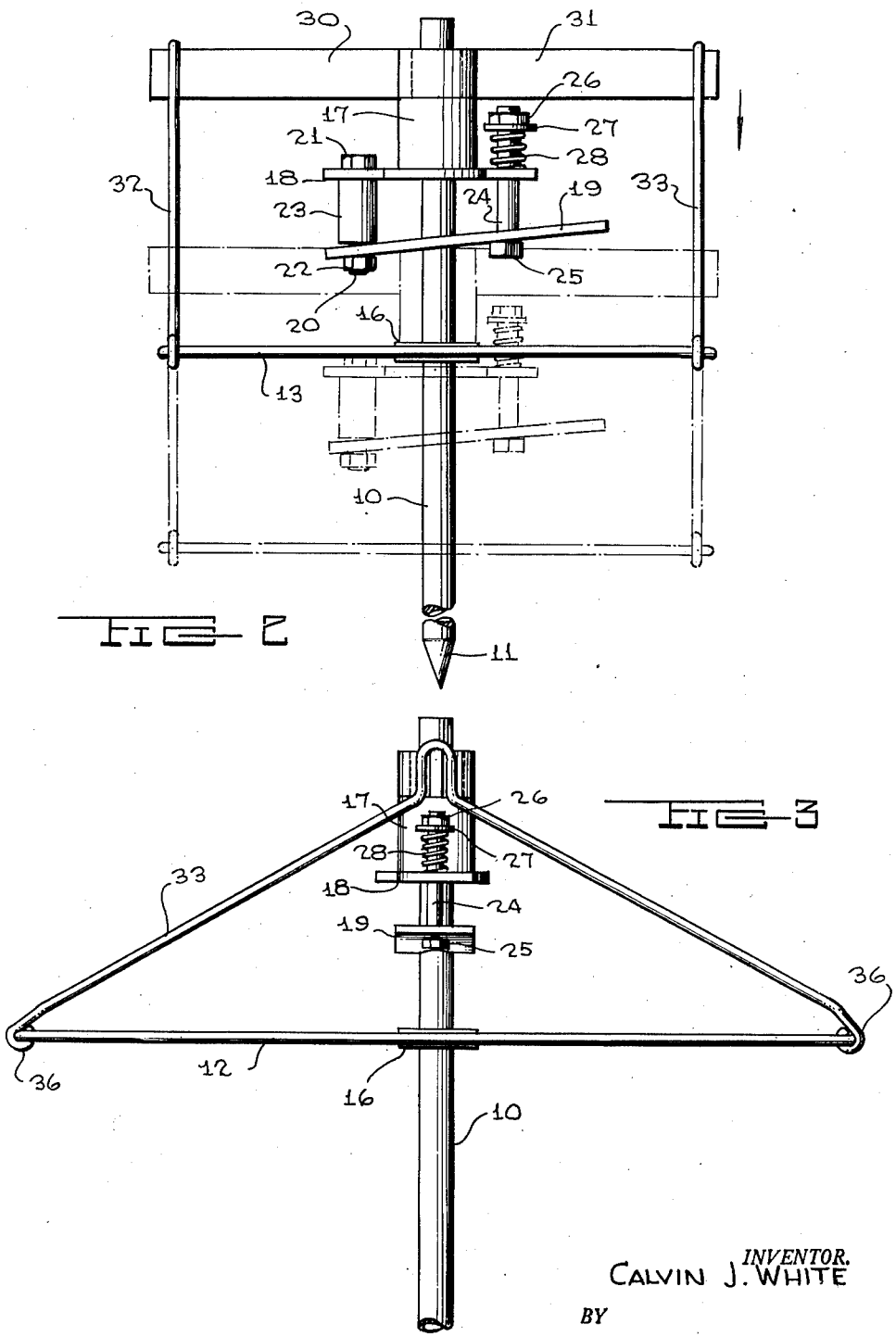

Patented May 5, 1953

2,637,313

UNITED STATES PATENT OFFICE 2,637,313

ADJUSTABLE GRILL

Calvin J. White, Brimley, Mich.

Application August 25, 1950, Serial No. 181,407

4 Claims. (Cl. 126—30)

This invention relates to a grill for cooking food over a fire and more particularly to an adjustable grill for cooking over an open fire and positioning the food at different distances from the fire.

It is among the objects of the invention to provide a grill assembly for cooking food, such as meat or fish, over an open fire, which assembly includes a supporting post, a grill having an opening slidably receiving the post and means supporting the grill from the post at selective positions of adjustment along the post and permitting rotation of the grill about the post so that the grill can be moved up and down relative to a cooking fire and either end of the grill can be swung toward or away from the fire, which is easy to set up in operative condition and can be disassembled and reduced to a highly compact condition for transportation and storage, and which is simple and durable in construction, economical to manufacture, and easy to use.

Other objects and advantages will become apparent from a consideration of the following description and the appended claims in conjunction with the accompanying drawings wherein:

Figure 1 is a top plan view of an adjustable grill assembly illustrative of the invention;

Figure 2 is an end elevational view of the grill assembly illustrated in Figure 1;

Figure 3 is a side elevational view of the grill assembly; and

Figure 4 is a cross sectional view on the line 4—4 of Figure 1.

With continued reference to the drawings, the grill assembly comprises an elongated post 10 which may conveniently be formed from a suitable length of metal tubing having a conical extension 11 secured to one end thereof to provide a suitable point for forcing the post into the ground.

The grill 12 is of elongated, rectangular shape and includes a wire frame 13 of rectangular shape, a plurality of longitudinally extending bars 14 disposed at substantially uniform intervals between the side portions of the frame 13 substantially parallel to the frame side portions and to each other and a plurality of transverse bars 15 extending between the frame side members and disposed at substantially uniform intervals therealong, the transverse members being substantially parallel to each other and substantially perpendicular to the longitudinal bars 14. The longitudinal bars 14 are preferably interwoven with the transverse bars 15 to provide a grid structure within the grill frame upon which articles of food to be cooked can be conveniently supported.

An annular collar 16 is secured in an opening in the grid substantially at the center of the grill and slidably receives the post 10, permitting the grid to move up and down longitudinally of the post and to rotate about the post.

A bracket sleeve 17 slidably receives the post 10 above the grill 12 and a plate 18 of elongated, rectangular shape is secured intermediate its length to the lower end of the sleeve 17 and is provided with apertures disposed one near each end of the plate and one in alignment with the bore of the sleeve 17 to slidably receive the post.

A second plate 19 is spaced below the plate 18 and provided with apertures which are respectively in alignment with the apertures in the plate 18. A bolt 20 extends through the apertures in corresponding ends of the two plates 18 and 19 and has at one end a head 21 resting upon the upper surface of the plate 18 and at its other end a nut 22 bearing against the under surface of the lower plate 19. A spacer sleeve 23 surrounds the bolt between the plates 18 and 19 to maintain the corresponding ends of these plates spaced apart at a predetermined distance.

A bolt 24 extends through the apertures at the opposite ends of the plates 18 and 19 and this bolt has a head 25 bearing against the under surface of the lower plate 19. The bolt 24 is longer than the bolt 20 and extends through the side of the plate 18 remote from the plate 19. This bolt carries a nut 26 on its end remote from the head 25 and a spring abutment washer 27 bears against the under side of the nut. A coiled compression spring 28 surrounds the bolt 24 between the upper side of the plate 18 and the washer 27 and tends to lift the corresponding end of the lower plate 19, thereby cramping the plate 19 relative to the post 10 to hold the sleeve 17 at selective positions of adjustment along the post. The plate 19 extends outwardly beyond the corresponding end of the plate 18 receiving the bolt 24 to provide a lever for manually moving the plate 19 against the force of spring 28 to relieve the cramping action of the plate 19 relative to the post and free this assembly for sliding movement up or down the post. When the plate 19 is released, the spring 28 will cause it to cramp relative to the post, as explained above, to hold the sleeve 17 at the selected position of adjustment.

An elongated bar 30 has at its mid-length location an annular enlargement 31 in which the end of sleeve 17 remote from plate 18 is secured. The portions of the bar 30 at the respectively opposite sides of the enlargement 31 extend perpendicularly outwardly from the sleeve 17 and post 10 in respectively opposite directions and to substantially the same extent.

A pair of bails 32 and 33 are suspended one from each end of the bar 30 and are connected at their ends to the end portions of the rectangular grill frame 12 near the corresponding corners of the grill. The bar 30 is of elongated, rectangular cross sectional shape and the bails 32 and 33 have at their mid-length location U-shaped formations 34 and 35 respectively of generally rectangular shape closely receiving the corresponding portions of the bar 30 to support the bails on the bar against rocking movement of the former relative to the latter. At their ends the bails are provided with eye formations, as indicated at 36, surrounding the corresponding end portions of the grill frame to firmly secure the bails to the grill. The bails thus extend longitudinally of the grill at the opposite sides thereof and in planes substantially parallel to the adjacent side portions of the grill frame.

With this arrangement, the grill 12 is firmly held against rocking movements relative to the post but can be rotated freely around the post so that either end of the elongated grill may be placed over the fire or swung away from the fire, as may be desired, and the grill may be adjustably moved up and down the post to move it closer to or further away from the fire and is releasably supported on the post at any desired position of adjustment thereaong.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. An adjustable grill assembly comprising a supporting post disposed in upright position, a grill, an annular collar secured in said grill substantially at the center thereof and slidably receiving said post, a sleeve slidably receiving said post, a first plate secured intermediate its length to one end of said sleeve and having apertures disposed one near each end thereof and one in alignment with the bore of said sleeve, a second plate spaced from said first plate and having apertures respectively in alignment with the apertures in said first plate, a first bolt extending through the apertures at corresponding ends of said first and second plates, a spacer sleeve receiving said first bolt between said plates, a second bolt extending through the apertures at the other ends of said plates and beyond the side of said first plate remote from said second plate, a spring abutment on the end of said second bolt at the side of said first plate remote from said second plate, a spring surrounding said second bolt between said first plate and said spring abutment cramping said second plate relative to said post to hold said sleeve at selected positions of adjustment along said post, a bar secured intermediate its length to the other end of said sleeve and having a sleeve receiving aperture therethrough, and bails suspended intermediate their length from said bar one at each end of the latter and secured at their ends to respectively opposite ends of said grill to suspend said grill from said bar.

2. An adjustable grill assembly comprising a supporting post, an elongated grill, an annular collar secured in said grill intermediate the ends thereof and slidably and rotatably receiving said post intermediate the ends of the latter, a sleeve slidably and rotatably receiving said post and spaced from said collar, manually releasable means secured to one end of said sleeve and frictionally engaging said post between said sleeve and said collar to hold said sleeve at selected positions of adjustment along said post, a bar secured intermediate its length to said sleeve and disposed substantially perpendicular to said post, and bails supported intermediate their ends one at each end of said bar and connected at their ends to said grill at the ends of the latter for suspending said grill from said bar.

3. An adjustable grill assembly comprising a supporting post, an elongated grill, an annular collar secured in said grill intermediate the ends thereof and slidably and rotatably receiving said post intermediate the ends of the latter, a sleeve slidably and rotatably receiving said post and spaced from said collar, manually releasable means secured to one end of said sleeve and frictionally engaging said post between said sleeve and said collar to hold said sleeve at selected positions of adjustment along said post, a bar of elongated rectangular cross sectional shape secured intermediate its length to said sleeve and disposed substantially perpendicular to said post, and bails supported on said bar one at each end of the latter and suspending said grill from said bar, each of said bails having at its mid-length location a U-shaped formation closely receiving the corresponding end portion of said bar to maintain said bails against rocking movement relative to said bar and each of said bails being secured at its ends to said grill at the respectively opposite ends of the latter.

4. An adjustable grill assembly comprising a supporting post, an elongated grill, an annular collar secured in said grill intermediate the ends thereof and slidably and rotatably receiving said post, a sleeve slidably and rotatably receiving said post and spaced from said collar, a first plate secured on the end of said sleeve adjacent said collar and extending to diametrically opposite sides of said post, a second plate disposed between said first plate and said collar and having an aperture therein receiving said post, means interconnecting said first and second plates at one side of said post to permit tilting movement of said second plate toward and away from said first plate, means interconnecting said plates at the other side of said post and including spring means resiliently urging said second plate toward said first plate to clamp said post in the aperture in said second plate to hold said sleeve at selected positions of adjustment along said post, a bar secured intermediate its length to said sleeve and disposed substantially perpendicular to said post, and bails supported intermediate their ends on said bar one at each end of the latter and connected at their ends to said grill at the opposite ends thereof for suspending said grill from said bar.

CALVIN J. WHITE.

References Cited in the file of this patent

UNITED STATES PATENTS

| Number | Name | Date |
| --- | --- | --- |
| 485,463 | Ennis | Nov. 1, 1892 |
| 557,501 | Ennis | Mar. 31, 1896 |
| 1,191,270 | Bartholomay | July 18, 1916 |
| 1,284,235 | Carlin | Nov. 12, 1918 |
| 1,368,388 | Church | Feb. 15, 1921 |
| 1,803,446 | Warrick | Mar. 5, 1931 |
| 1,879,865 | Wright | Sept. 27, 1932 |
| 2,522,036 | Haake | Sept. 12, 1950 |
| 2,540,752 | Negovan | Feb. 6, 1951 |
| 2,591,685 | Du Mais | Apr. 8, 1952 |